US011885522B2

(12) United States Patent
Robare et al.

(10) Patent No.: US 11,885,522 B2
(45) **Date of Patent: *Jan. 30, 2024**

(54) ROOM CONDITIONING COMFORT SWITCH

(71) Applicant: Ademco Inc., Golden Valley, MN (US)

(72) Inventors: Paul Robare, Wayzata, MN (US); Travis J. Read, Little Canada, MN (US); David J. Emmons, Coon Rapids, MN (US)

(73) Assignee: Ademco Inc., Golden Valley, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/659,223

(22) Filed: Apr. 14, 2022

(65) Prior Publication Data

US 2022/0235960 A1 Jul. 28, 2022

Related U.S. Application Data

(63) Continuation of application No. 16/694,797, filed on Nov. 25, 2019, now Pat. No. 11,326,803.

(51) Int. Cl.

| | |
|---|---|
| ***F24F 11/76*** | (2018.01) |
| ***F24F 11/67*** | (2018.01) |
| ***F24F 11/523*** | (2018.01) |
| ***F24F 11/56*** | (2018.01) |
| ***F24F 11/88*** | (2018.01) |
| ***H05B 47/19*** | (2020.01) |

(52) U.S. Cl.

CPC ............ *F24F 11/76* (2018.01); *F24F 11/523* (2018.01); *F24F 11/56* (2018.01); *F24F 11/67* (2018.01); *F24F 11/88* (2018.01); *H05B 47/19* (2020.01)

(58) Field of Classification Search

CPC .. F24F 11/76; F24F 11/88; F24F 11/67; F24F 11/56; H05B 47/19

USPC .......................................................... 700/276

See application file for complete search history.

(56) References Cited

U.S. PATENT DOCUMENTS

| | | | | |
|---|---|---|---|---|
| 2010/0163633 A1* | 7/2010 | Barrett | F24H 9/2064 | 236/49.3 |
| 2011/0031322 A1* | 2/2011 | Zou | F24F 11/30 | 236/1 B |
| 2011/0077758 A1* | 3/2011 | Tran | H02J 13/00024 | 700/94 |
| 2014/0158778 A1* | 6/2014 | Kates | F24F 11/74 | 236/1 B |

(Continued)

FOREIGN PATENT DOCUMENTS

| | | |
|---|---|---|
| JP | 2989424 B2 | 12/1999 |
| JP | 3269572 B2 | 3/2002 |

OTHER PUBLICATIONS

Prosecution History from U.S. Appl. No. 16/694,797, dated Aug. 10, 2021 through Jan. 19, 2022, 45 pp.

*Primary Examiner* — Md Azad

(74) *Attorney, Agent, or Firm* — Greenberg Traurig, LLP; Ryan D. Sharp; David J. Dykeman

(57) ABSTRACT

The disclosure is directed to a control device configured to control the distribution of conditioned air, or liquid, to a space inside a building. In some examples, the control device may be a wall mounted switch, similar to a light switch, inside or near the space. Operating the switch may send signals to control the position of a vent, or a valve, to allow or prevent conditioned air, or liquid, from changing the environment of the space in the building.

16 Claims, 8 Drawing Sheets

(56) References Cited

U.S. PATENT DOCUMENTS

| | | | | |
|---|---|---|---|---|
| 2015/0369503 | A1* | 12/2015 | Flaherty | F24F 11/74 700/277 |
| 2016/0291615 | A1* | 10/2016 | Zakaria | G05D 23/1934 |
| 2016/0348930 | A1* | 12/2016 | Mirante | F24F 13/1426 |
| 2021/0156587 | A1 | 5/2021 | Robare et al. | |

* cited by examiner

ROOM CONDITIONING COMFORT SWITCH

This application is a continuation of U.S. patent application Ser. No. 16/694,797, which was filed on Nov. 25, 2019, and is entitled, "ROOM CONDITIONING COMFORT SWITCH." The entire content of U.S. patent application Ser. No. 16/694,797 is incorporated herein by reference.

TECHNICAL FIELD

The disclosure relates to heating and air conditioning controls.

BACKGROUND

Buildings with heating, ventilation and air conditioning (HVAC) systems may heat and cool rooms using forced air distributed through ducts. Some examples of HVAC systems may include circulating warm liquid which may heat rooms through radiators or radiant flooring. The temperature of a room may be controlled by a thermostat somewhere in the building but may not necessarily be inside the room. The room therefore may receive forced air, or circulating water or other liquid, where the temperature of the forced air or liquid is controlled by another space.

SUMMARY

In general, the disclosure is directed to a control device configured to control the distribution of conditioned air, or liquid, to a space inside a building. In some examples, the control device may be a wall mounted switch, similar to a light switch, inside or near the space. Operating the switch may send signals to control the position of a vent, or a valve, to allow or prevent conditioned air, or liquid, from changing the environment of the space in the building.

In one example, the disclosure is directed to a system comprising: a register device comprising: one or more dampers; a motor configured to adjust a positioning of the one or more dampers to at least a first damper position and a second damper position, wherein in the first damper position, the one or more dampers are substantially open and in the second damper position, the one or more dampers are substantially closed; receiver circuitry; and a first power source configured to deliver power to the motor and the receiver circuitry; a controller device comprising:

a housing configured to be mounted to a wall; a first user input mechanism configured to receive user input; transmitter circuitry configured to: wirelessly transmit, in response to a first user input at the first user input mechanism, a first signal to the receiver circuitry of the register device to cause the motor to adjust the positioning of the one or more dampers to the first damper position; and wirelessly transmit, in response to a second user input at the first user input mechanism, a second signal to the receiver circuitry of the register device to cause the motor to adjust the positioning of the one or more dampers to the second damper position; and a second power source configured to deliver power to the transmitter circuitry.

In another example, the disclosure is directed to a controller device, the device comprising: a housing configured to be mounted to a wall; a first user input mechanism configured to receive user input; transmitter circuitry configured to: wirelessly transmit, in response to a first user input at the first user input mechanism, a first signal to a register device, separate from the controller device, to cause the register device to adjust the positioning of one or more dampers of the register device to a first damper position; and wirelessly transmit, in response to a second user input at the first user input mechanism, a second signal to the register device to cause the register device to adjust the positioning of the one or more dampers to a second damper position; and a power source configured to deliver power to the transmitter circuitry.

The details of one or more examples of the disclosure are set forth in the accompanying drawings and the description below. Other features, objects, and advantages of the disclosure will be apparent from the description and drawings, and from the claims.

DETAILED DESCRIPTION

The disclosure is directed to a control device configured to control the distribution of conditioned air, or liquid, to a space inside a building. Most buildings, such as residential homes, have rarely used spaces that do not require cooling (or heating) at all times. Also, in some examples, a room's occupant may want to control the environment of a room differently the environmental settings for the remainder of the building. The controller device of this disclosure gives building occupants the ability to turn off conditioning, such as when a space is unoccupied and switch the conditioning on again when desired.

In some examples, the controller device may be a wall mounted switch, similar to a light switch, inside or near the space. Operating the switch may control the position of a vent, or a valve, to allow or prevent conditioned air, or liquid, from changing the environment of the space in the building. In other examples, the controller device may have several settings, to allow a vent, or valve, to be set fully ON, fully OFF, or some intermediate position. In other examples, the controller device may include one or more sensors that are configured to control the position of a vent, or valve, based on a temperature or other environmental condition of a room. In other examples, the controller device may also be configured to operate other features in the room, such as a light switch or an outlet.

Figure 1:
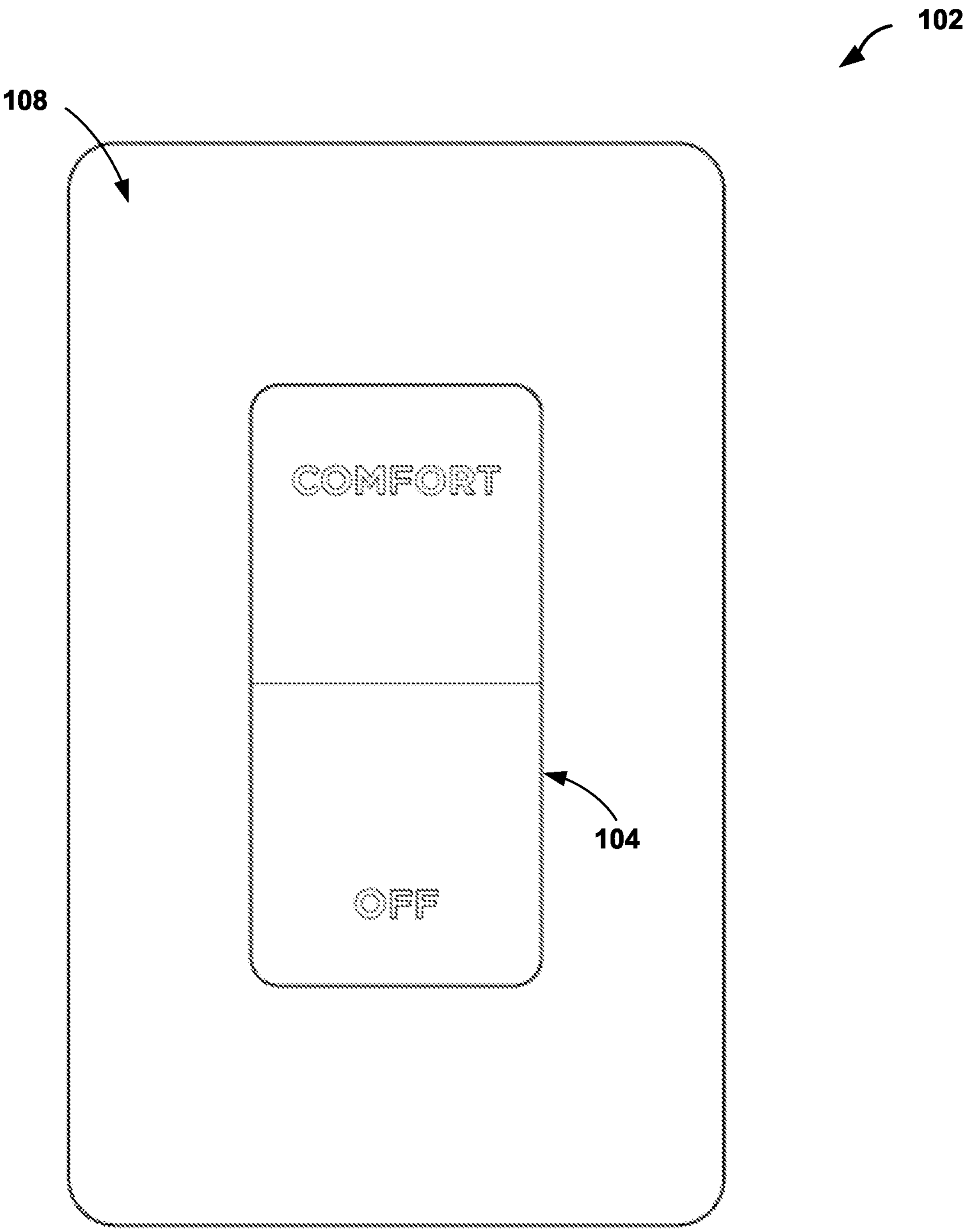
FIG. 1 is a conceptual diagram illustrating an example of a controller device configured to be mounted to a wall of a room, in according to one or more techniques of this disclosure.

FIG. 1 is a conceptual diagram illustrating an example of a controller device configured to be mounted to a wall of a room, in according to one or more techniques of this disclosure. Controller device 102 includes housing 108 and user input mechanism 104.

Housing 108 may be configured to be mounted to a wall in or near the room of a building. Inside housing 108 may include circuitry configured to transmit and/or receive signals from a device controlling a register damper, or similar mechanism, that controls the flow of forced air into the room (not shown in FIG. 1). In some examples the circuitry may be powered by a battery or similar power storage device. The example of controller 102 powered by a battery may have advantages over other types of devices because a battery powered controller 102 may have simplified assembly compared to other types of devices.

In some examples, controller device 102 is configured to fit into a standard sized 1-gang electrical box. In other examples controller device 102 may be configured to be installed in a 2-gang or larger electrical box along with one or more other electrical devices, such as a light switch or similar device.

Controller device 102 includes user input mechanism 104 configured to receive user input, and in the example of FIG. 1, is similar to a light switch. User input mechanism 104 may be set to OFF, which may signal a register device to close a damper to prevent forced air from an HVAC system from passing through the damper and into the room (not shown in FIG. 1). User input mechanism 104 may be set to COMFORT, which may signal the register device to open the damper and allow conditioned air to affect the environment of the room.

The system of this disclosure may provide benefits to improve the environmental management of a building. For example, by closing off dampers to unused rooms, conditioned air may be reserved for rooms that are in use, which may reduce energy costs. The controller device of this disclosure may offer a low-cost and convenient control in an expandable solution, e.g. the ability to easily turn a room's conditioning on and off like the lights. In some examples, wireless dampers inserted into ductwork can start and stop airflow on command, and the controller device may be installed in as many or as few rooms as desired.

Figure 2:
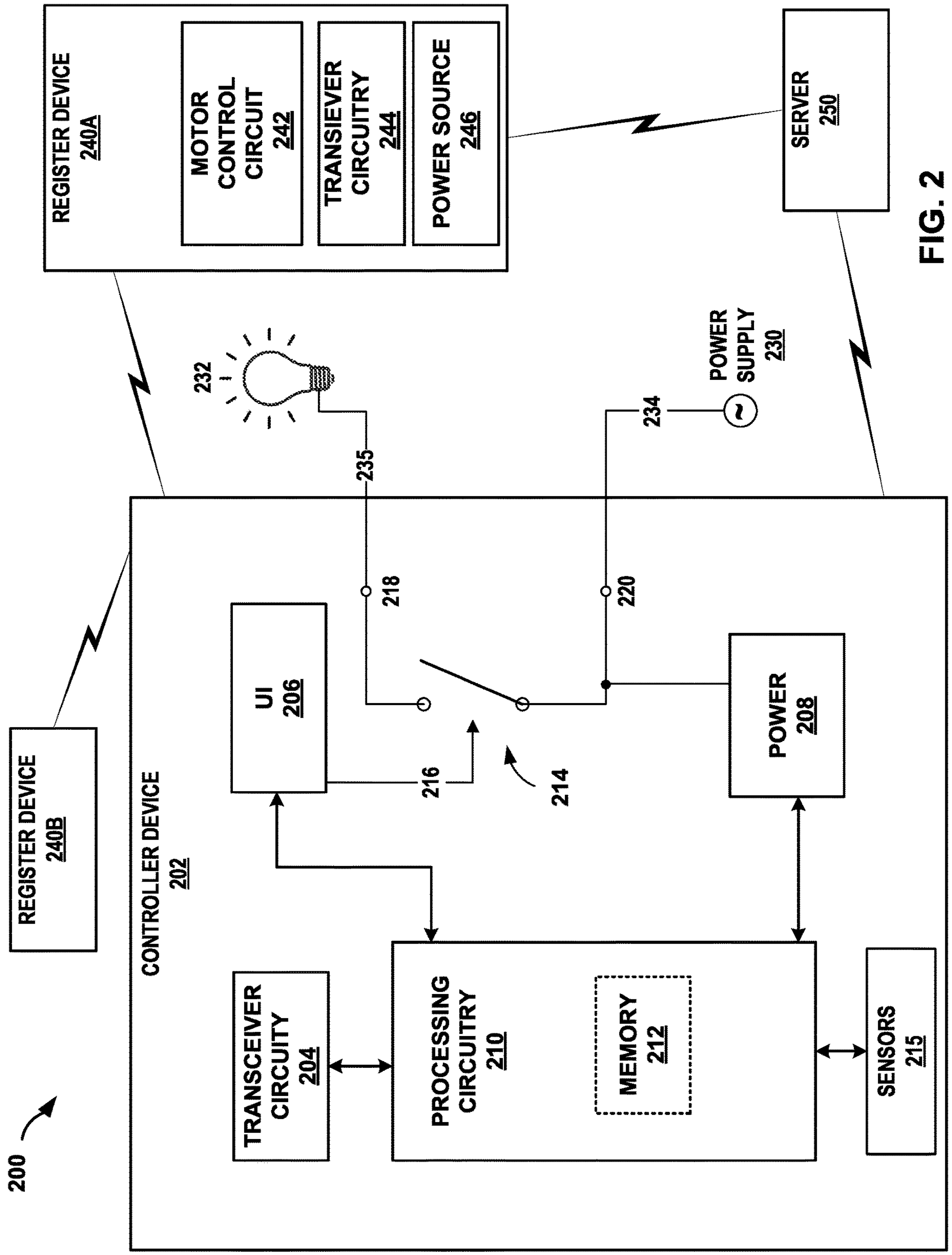
FIG. 2 is a block diagram illustrating an example system that includes a controller device configured to allow or prevent an HVAC system of a building from changing the environment of a room.

FIG. 2 is a block diagram illustrating an example system that includes a controller device configured to allow or prevent an HVAC system of a building from changing the environment of a room. Controller device 202 is an example of controller device 102 described above in relation to FIG. 1 and includes the same functions and characteristics as controller device 102. Controller devices 102 and 202 may also be referred to as "comfort switch" in this disclosure.

In the example of FIG. 2, system 200 includes controller device 202, register devices 240A and 240B, server 250, power supply 230 and light fixture 232. Controller device 202 may send, and in some examples also receive, signals from register devices 240A and 240B. Controller device 202 and register devices 240A and 240B may also be in communication with a server 250, in some examples. In the example of FIG. 2, the communication between controller device 202, register devices 240A, 240B and server 250 is depicted as wireless communication. However, in other examples, the components of system 200 may also communicated via wired communication techniques such as Ethernet, or similar protocols. Wireless communication may be implemented in system 200 by one or more of Bluetooth, Zigbee, Wi-Fi, or other wireless communication protocols. Examples of server 250 may include a Wi-Fi routing device, a general purpose computer, or similar device that may be connected to a building network.

Controller device 202 may include processing circuitry 210, transceiver circuitry 204, a user input mechanism, UI 206, a power source 208, one or more sensors 215 and a switch 214 controlled by one or more features of UI 206. Controller device 202 may include a housing configured to be mounted to a wall (not shown in FIG. 2).

Register device 240B is an example of register device 240A and may include the same functions and characteristics as register device 240A. For simplicity, the description of FIG. 2 will focus on register device 240A, however, the description may equally apply to register device 240B, unless otherwise noted.

Transceiver circuitry 204 may include transmitter circuitry configured to transmit a signal to transceiver circuitry 244 of register devices 240A and 240B to cause a motor to adjust the positioning of the one or more dampers to a an OPEN, CLOSED, or some intermediate damper position. For example, in response to a user input to move user input mechanism 104 (depicted in FIG. 1) to an OFF position, transceiver circuitry 204 may send a first signal to receiver circuitry that is part of transceiver circuitry 244 of register device 240A to cause the motor to adjust the positioning of the one or more dampers to the CLOSED damper position. Similarly, in response to a user input to move user input mechanism 104 to the COMFORT position, transceiver circuitry 204 may send a second signal to the receiver circuitry of register device 240A to cause the motor to adjust the positioning of the one or more dampers to the OPEN damper position.

Register device 240A may include motor control circuit 242 that is in communication with transceiver circuitry 244. Motor control circuit 242 may drive a motor, solenoid or similar mechanism to control the position of a damper or valve based on signals received by the receiver circuitry of transceiver circuitry 244.

In some examples, register device 240A may also be configured to receive control commands from a second controller device of the HVAC system of the building. The other control commands may also cause register device 240A to control the position of the damper or valve. In some examples, signals from controller device 202 may be configured to have higher priority than a third signal from the second controller device. For example, the second controller device may be in communication with the HVAC thermostat and be configured to operate register device 240A in accordance with commands from the thermostat. However, in examples in which commands from controller device 202 have priority, register device 240A may adjust the positioning of the one or more dampers to comply with the signals from controller device 202, without regard for the third signal from the second controller. For example, a user may want to prevent air flow to an unused room at certain times but allow the thermostat configuration and the second controller to control register device 240A at other times.

Power source 246 of register device 240A may deliver power to transceiver circuitry 244 and to motor control circuit 242 to drive the motor. In some examples power source 246 may include a replaceable or rechargeable battery, a transformer or other source of electrical power.

In some examples, transceiver circuitry 244 may include transmitter circuitry that may communicate with controller device 202, or other components of system 200. In some examples, transmitter circuitry of register device 240A may transmit a status, such as damper or valve OPEN, battery status of power source 246, to relay signals from control device 202 to a more distance receiver device, and similar signals.

Controller device 202 may also include processing circuitry 210, which may further include computer readable storage media, memory 212. Processing circuitry 210 may receive user input from UI 206 and cause transceiver circuitry 204 to send the appropriate signal to register device 240A. UI 206 may include one or more of user input mechanism comprises one of a toggle switch, a rotary switch, a rocker switch, a push button switch, or a slider switch, or similar mechanisms to perform the functions described in this disclosure. In some examples, UI 206 may also include a display.

Examples of processing circuitry 210 in controller device 202 may include any one or more of a microcontroller (MCU), e.g. a computer on a single integrated circuit containing a processor core, memory, and programmable input/output peripherals, a microprocessor (μP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry. Accordingly, the terms "processing circuitry," "processor" or "controller," as used herein, may refer to any one or more of the foregoing structures or any other structure operable to perform techniques described herein. Examples of memory 212 may include memory integrated as part of processing circuitry, or separate memory, including read only memory (ROM), random access memory (RAM) and similar examples of computer readable storage. media.

Controller device 202 may also be configured to operate other functions within a room, such as a light switch or an outlet. In the example of FIG. 2, controller device 202 includes a first terminal 220 configured to receive a first portion of hot wire 234 from power supply 230. A second terminal 218 of controller device 202 receives a second portion 235 of the hot wire that leads to light fixture 232. UI 206 may include another user input mechanism configured to open and close the electrical connection, e.g. switch 214, between the first portion 234 of the hot wire and the second portion 235 of the hot wire. The connection 216 between UI 206 and switch 214 may be an electrical signal or a mechanical connection that operates switch 214.

In some examples, power supply 230 may originate from line power for the building, for example, 120 VAC, 240 VAC, 230 VAC or other voltages, depending on the line power standards of the building location. In other examples, power supply 230 may be originate from a transformer, such as a 24V transformer on an HVAC system. In some examples, power source 208 may receive electrical energy provided from power supply 230, which may be used to provide power for the functions of controller device 202, such as transceiver circuitry 204. In some examples the power from power supply 230 may recharge a battery included in power source 208. In some examples power source 208 may include a power converter configured to receive the electrical energy from power supply 230 and convert the electrical energy to power for use by the transmitter circuitry, for example an AC-DC power converter.

In some examples, controller device 202 may include one or more sensors 215. Sensors 215 may include sensors to measure temperature, humidity and other factors of the room's environment. In some examples, processing circuitry 210 may cause transceiver circuitry 204 to send signals to register device 240A based on environmental factors measured by sensors 215.

Figure 3:
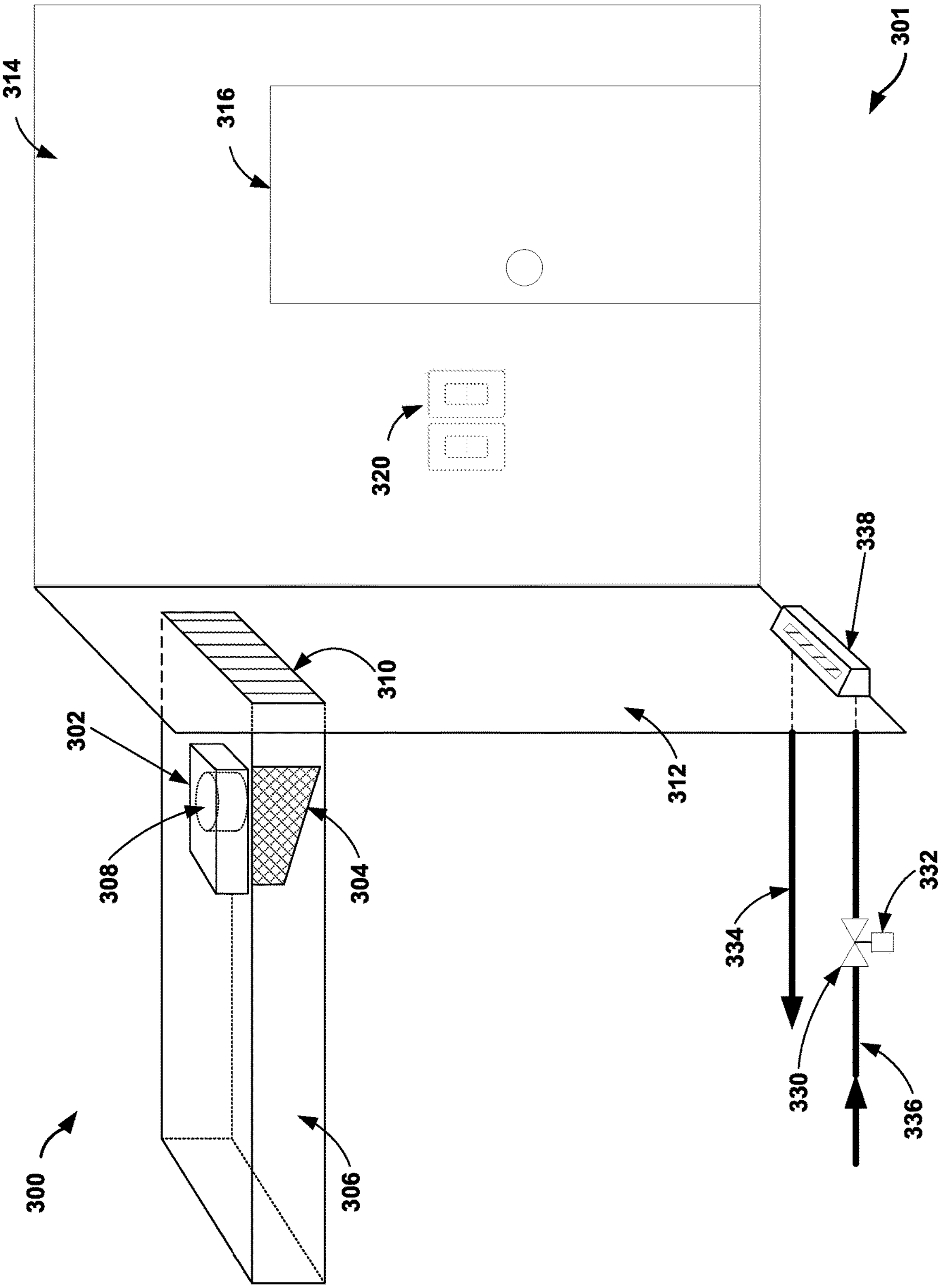
FIG. 3 is a conceptual illustrating an example system that includes a controller device and control mechanisms to prevent or allow an HVAC system of a building from changing the environment of a room.

FIG. 3 is a conceptual illustrating an example system that includes a controller device and control mechanisms to prevent or allow an HVAC system of a building from changing the environment of a room. System 300 of FIG. 3 is an example of system 200 described above in relation to FIG. 2.

System 300 may include controller device 320, register device 302 configured to control dampers 304. System 300 may also include a radiator 338 that may extract heat from liquid circulating from inflow pipe 336 to outflow pipe 334. Controller device 320 may also be configured to send signals to control the operation of valve device 330.

Controller device 320 is an example of controller device 102 and controller device 202 described above in relation to FIGS. 1 and 2. Controller device may have the same or similar functions and characteristics as controller device 102 and controller device 202, unless otherwise noted. For example, controller device 320 may include transmitter circuitry configured to wirelessly transmit a first signal to receiver circuitry (not shown in FIG. 2) of register device 302 based on a first user input at a user input mechanism of controller device 320. The first signal may cause motor 308 of register device 302 to adjust the positioning of the one or more dampers 304 to a CLOSED damper position. Controller device 320 may be configured to be mounted in a standard electrical box along with one or more other electrical devices, such as a light switch or similar device. In some examples controller device 320 may be powered by a battery or similar energy storage device.

Similarly, controller device 320 may wirelessly transmit a second signal to the receiver circuitry of register device 302, based on a second user input at the first user input mechanism, such as moving a switch to an OPEN or COMFORT position, as described above in relation to FIG. 1. The second signal may cause motor 308 to adjust the positioning of dampers 304 to an OPEN damper position, for example. Though dampers 304 is depicted as a single plate in the example of FIG. 3, in other examples, dampers 304 may be two or more pieces that move to open or restrict air flow through duct 306.

In some examples, the CLOSED damper position may substantially block air flow to room 301. In other words, the plates or vanes of a damper may not completely seal the flow of air through duct 306, therefore though the CLOSED position may be considered substantially closed, some flow of air may still move past damper 304. Similarly, the OPEN position, may restrict airflow to some degree, therefore, though the damper is substantially open, the air flow may be somewhat restricted compared to other portions of duct 306 without a damper.

Room 301 depicted in FIG. 3 is defined by walls 312 and 314. Duct 306 provides forced air supplied by and HVAC system (not shown in FIG. 3) through vent 310. Though only a s single vent 310 is depicted in FIG. 3, in other examples duct 306 may include one or more branches that feed multiple vents 310 into room 301. In some examples, damper 304 and register device 302 may be located at a branch point of duct 306 (not shown in FIG. 3), which may allow a single register device to control the air flow to all the vents into room 301. In some examples, a single register device at a branch point may control the flow of air to more than one room. In other examples, register device 302 and damper 304 may be integrated as part of vent 310 (not shown in FIG. 3).

In other examples, the transmitter circuitry of controller device 320 may be configured to wirelessly transmit a first signal to receiver circuitry 332 of valve device 330 based on the first user input at the user input mechanism of controller device 320. The first signal may cause a solenoid, or some similar activation component of valve device 330 to adjust the positioning of a valve, of valve device 330 to a CLOSED position.

Also, as depicted in FIG. 2, controller device 320 may control one or more register devices 302 and/or one or more valve devices 330 at the same time. For example, a "space" within a building may include one or more rooms, or a room with one or more vent ducts. Controller device 320 may control the environment of the space by wirelessly transmitting signals to multiple register devices, where each register device controls a separate vent duct into the space.

Similar to the description for damper 304, when in the CLOSED position, some liquid may still flow through the valve of valve device 330. In some examples, a valve may intentionally include an orifice that allows pressure on either side of the valve to equalize when the valve is CLOSED. Therefore, though the valve is substantially closed, some liquid may flow past the valve. Also, the valve may be substantially open when in the OPEN position, the valve may still restrict flow, e.g. when compared to other portions of inflow pipe 336 and outflow pipe 334 that do not include a valve.

To allow liquid to flow to radiator 338, controller device 320 may wirelessly transmit a second signal to receiver circuitry 332 of valve device 330, based on a second user input as described above for register device 302. The second signal may valve device 330 to open the valve, allowing radiator 338 to warm the room. Similar to the branches of duct 306, inflow pipe 336 may branch to feed two or more radiators in room 301, or into more than one room. Valve device 330 may be located between the branch and the source of heated liquid to control the flow to multiple radiators.

Controller device 320 is located on wall 314 inside of door 316 in the example of FIG. 3. In other examples controller device 320 may be mounted outside room 301 to control register device 302 and/or valve device 330. Use of a controller device, such as controller device 320, along with register device 302 may provide advantages by conveniently controlling the environment of room 301 separately from the rest of the building in which room 301 is located. In some examples, one or more vents, such as vent 310, may be in difficult to reach locations, such as under or behind furniture, in a ceiling, and similar locations. Individually opening and closing all the vents of a room may be difficult in some examples. Use of controller device 320 may simplify the separate control of the environment of room 301.

Figure 4:
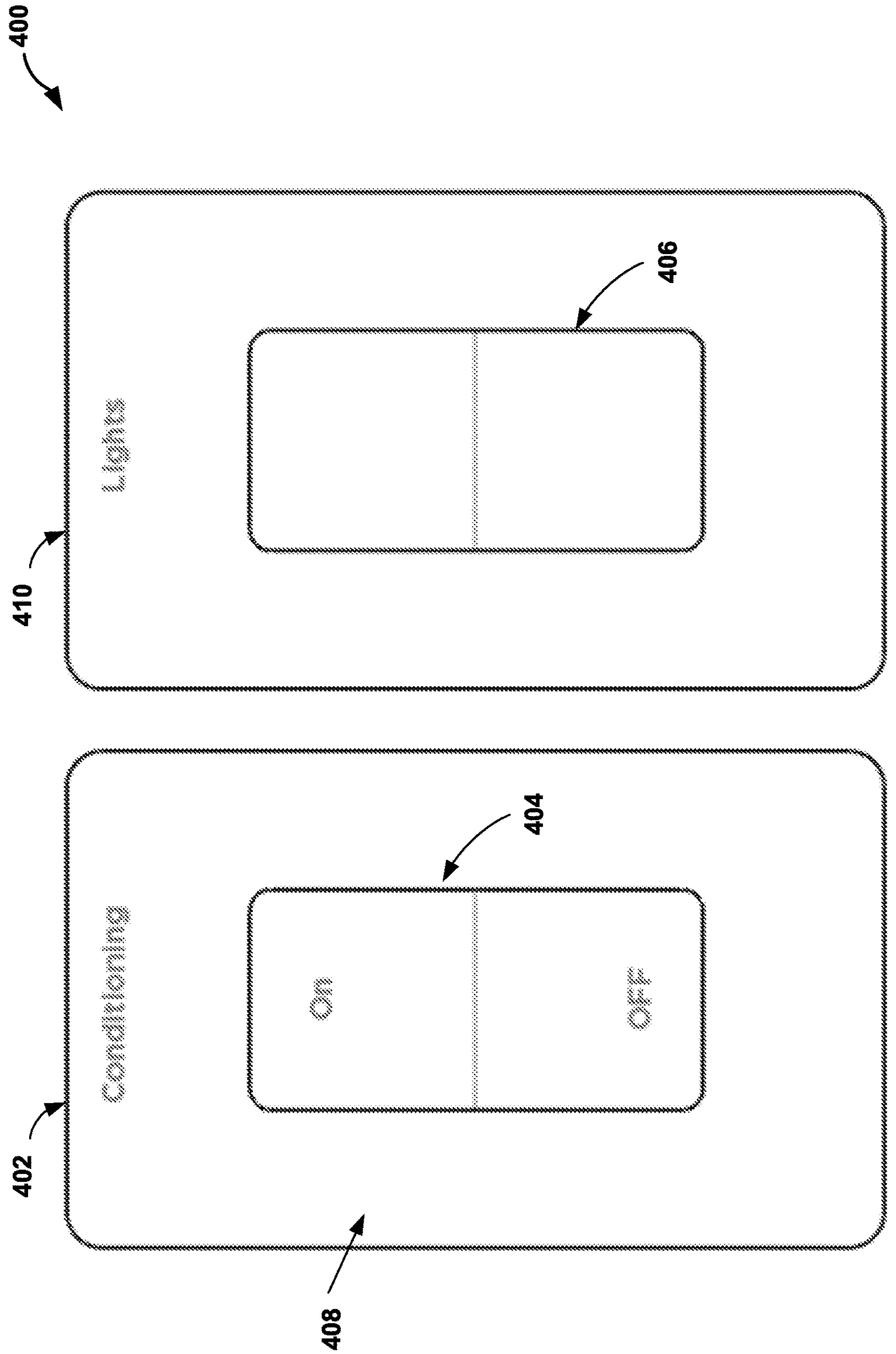
FIG. 4 is a conceptual diagram illustrating an example of a controller device according to one or more techniques of this disclosure.

FIG. 4 is a conceptual diagram illustrating an example of a controller device according to one or more techniques of this disclosure. System 400 of FIG. 4 is an example of system 200 and 300 described above in relation to FIGS. 2 and 3.

System 400 includes controller device 402, which is an example of controller devices 102, 202 and 320 described above in relation to FIGS. 1-3 and may include the same or similar functions and characteristics. The example of system

400 depicts a light switch 410 with a separate housing from housing 408 of controller device 402. In some examples controller device 402 may be mounted on a wall next to an existing light switch 410 and be a completely separate device. In other examples user input mechanism 406 for light switch 410 may be included in the same housing 408 as user input mechanism 404, and both light switch 410 and controller device 402 are a single integrated unit, as depicted in FIG. 2.

Figure 5:
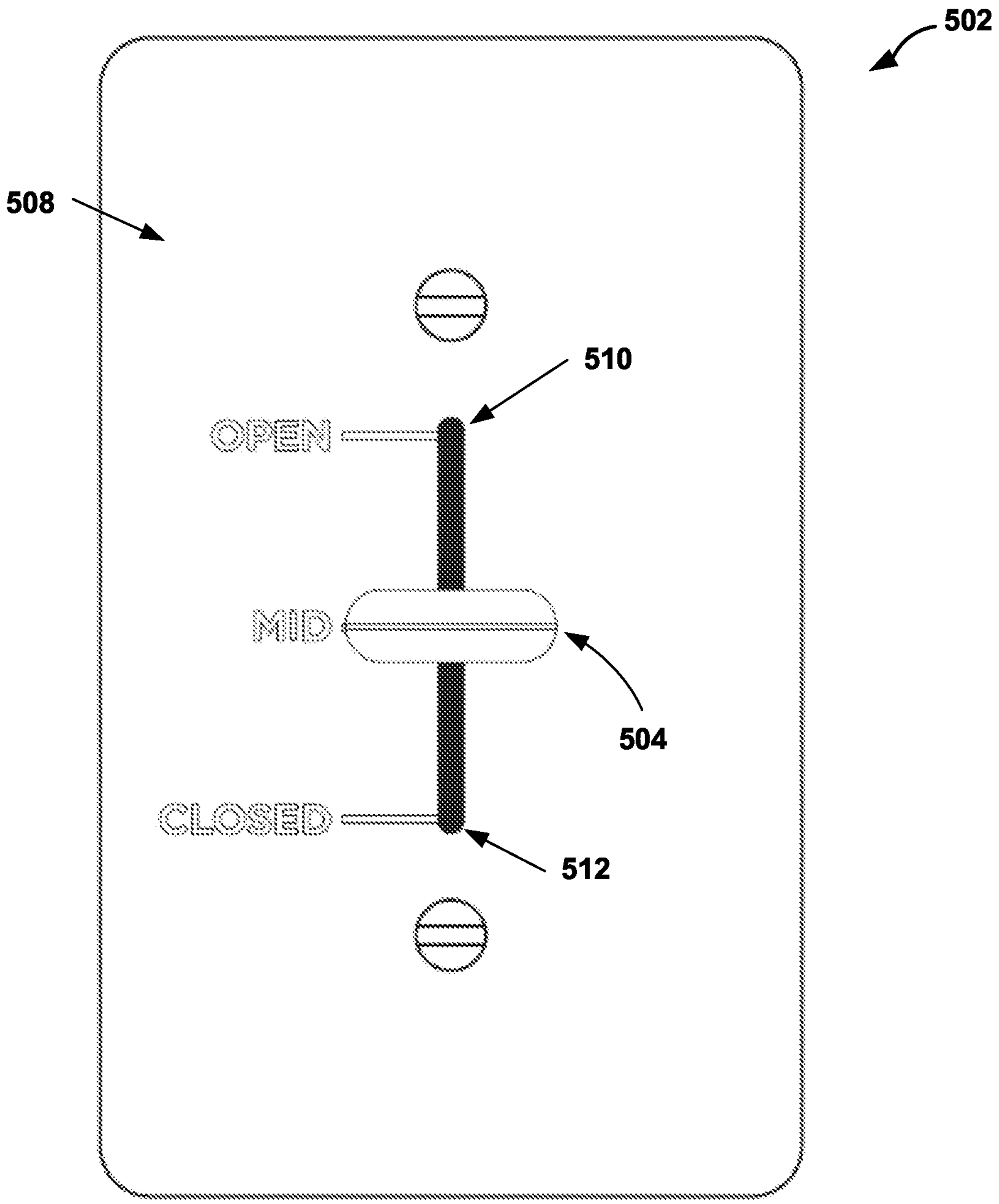
FIG. 5 is a conceptual diagram illustrating an example of a controller device with multiple position settings according to one or more techniques of this disclosure.

FIG. 5 is a conceptual diagram illustrating an example of a controller device with multiple position settings according to one or more techniques of this disclosure. Controller device 502 is an example of controller devices 102, 202, 320 and 402 described above in relation to FIGS. 1-4 and may include the same or similar functions and characteristics.

User input mechanism 504 is depicted as a sliding switch in FIG. 5 and is an example of UI 206 described above in relation to FIG. 2. User input mechanism 504 is shown in the middle position ("MID" in FIG. 5). Other positions include open 510 and closed 512. As described above in relation to FIG. 2, housing 508 may include transmitter circuitry configured to wirelessly transmit, in response to user input at user input mechanism 504, a signal to the receiver circuitry in a register device, or valve device (not shown in FIG. 5), to cause a motor to adjust positioning of one or more dampers to a middle damper position. The middle damper position may be more closed than the OPEN damper position and more open than the CLOSED damper position. In other examples, controller device 502 may have two or more middle positions, rather than the single middle position shown in FIG. 5. In other examples, not shown in FIG. 5, controller device 502 may include a second user input mechanism integrated with housing 508 to control other room features, such as light fixtures or outlets.

Figure 6:
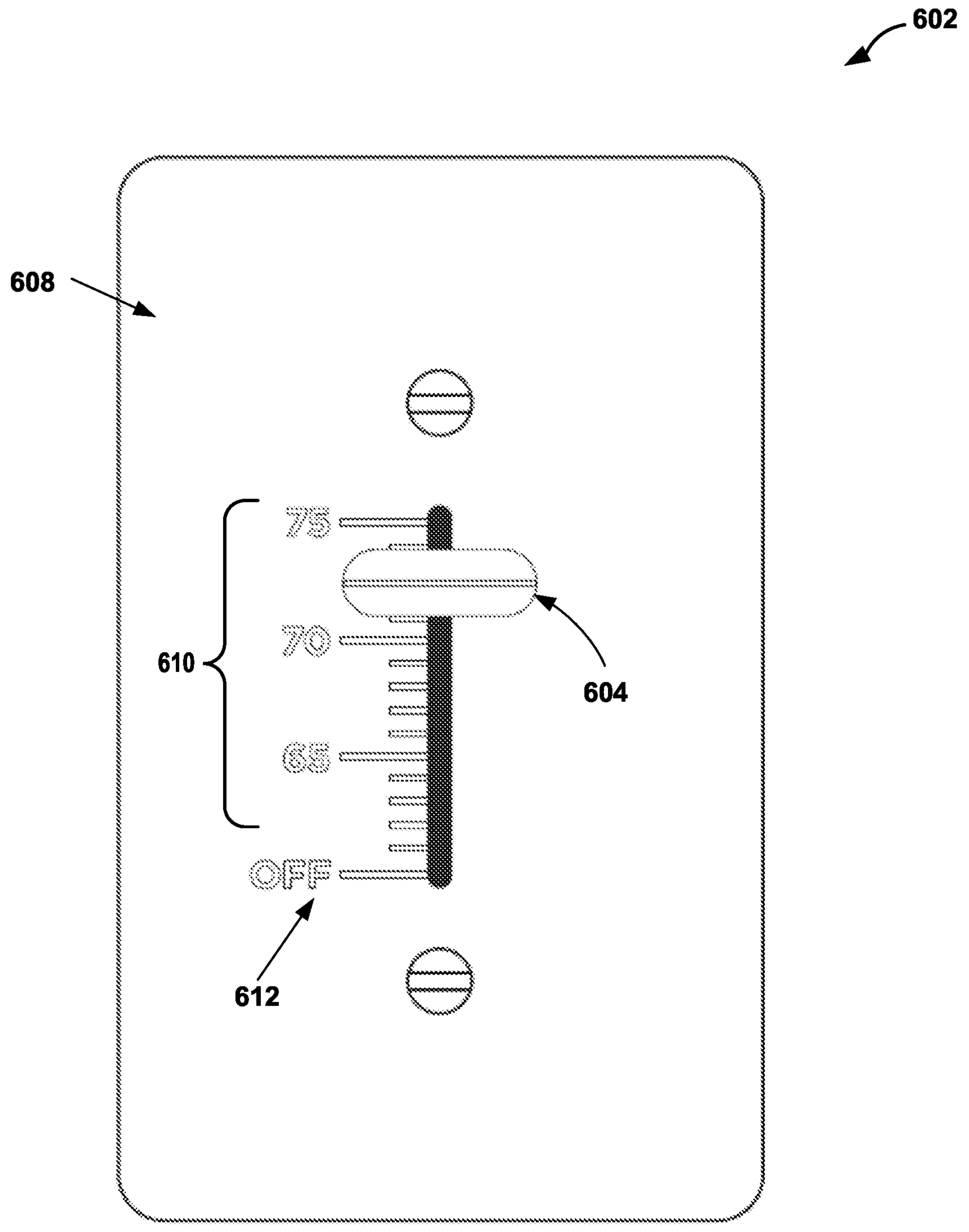
FIG. 6 is a conceptual diagram illustrating an example of a controller device with a thermostat control according to one or more techniques of this disclosure.

FIG. 6 is a conceptual diagram illustrating an example of a controller device with a thermostat control according to one or more techniques of this disclosure. Controller device 602 is an example of controller devices 102, 202, 320 and 402 described above in relation to FIGS. 1-4 and may include the same or similar functions and characteristics.

Housing 608 includes user input mechanism 604, processing circuitry and one or sensors (not shown in FIG. 6), such as sensors 215 described above in relation to FIG. 2. In the example of FIG. 6, user input mechanism 604 is depicted as a slider switch that may be positioned in the OFF setting 612, or at a position along temperature scale 610. In response to user input at user input mechanism 604, processing circuitry within housing 608 may set a temperature setpoint. The transmitter circuitry within housing 608 may be further configured to wirelessly transmit a signal to the receiver circuitry in a register device (not shown in FIG. 6) to cause the motor to adjust positioning of the one or more dampers based on a magnitude of temperature measured at the sensor relative to the temperature setpoint. Similar to controller device 502 described above in relation to FIG. 5, in some examples controller device 602 may include a second user input mechanism integrated with housing 608 to control other room features, such as light fixtures or outlets (not shown in FIG. 6).

Figure 7:
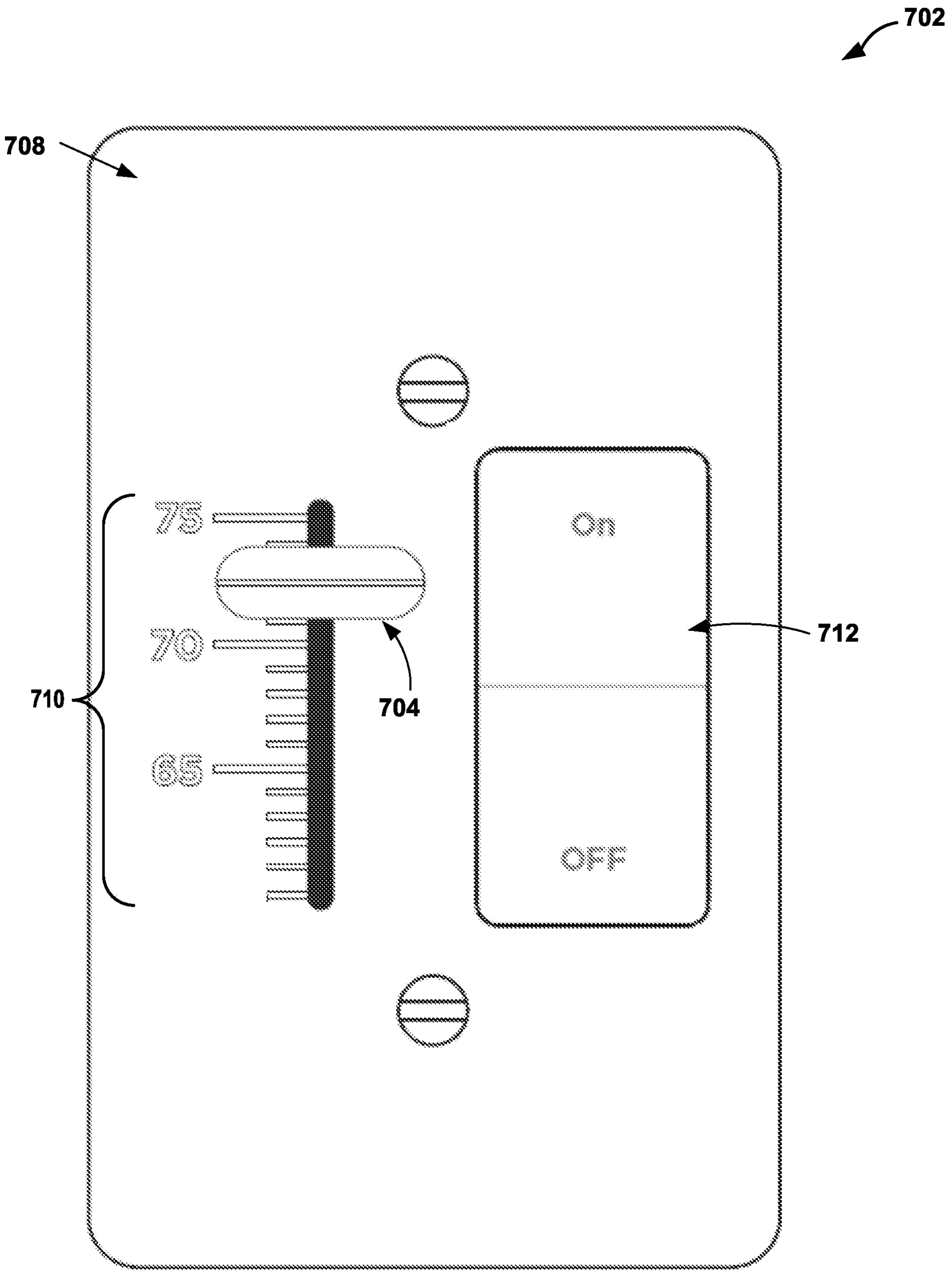
FIG. 7 is a conceptual diagram illustrating an example of a controller device with both thermostat and ON-OFF control according to one or more techniques of this disclosure.

FIG. 7 is a conceptual diagram illustrating an example of a controller device with both thermostat and ON-OFF control according to one or more techniques of this disclosure. Controller device 702 is an example of controller device 602 described above in relation to FIG. 6 and may include the same or similar functions and characteristics. For example, controller device 702 may be configured to be installed in a standard electrical box. In some examples controller device 702 may be installed in a standard electrical box along with one or more other electrical devices, such as a light switch or similar device. In some examples controller device 702 may be powered by a battery or similar storage device.

Similar to controller device, 602, controller device 702 includes user input mechanism 704, which is depicted as a slider switch that may be positioned along temperature scale 710. As with controller device 602, transmitter circuitry within housing 708 may send signals to control the position of a damper or valve based on the magnitude of temperature measured at a sensor relative to a temperature setpoint.

Controller device 702 also includes a second user input mechanism, 712. User input mechanism 712 may be configured to cause transmitter circuitry to send signals to set the damper, or valve, to either the OPEN or CLOSED position. In some examples, user input mechanism 712 may be configured to control a light fixture. In other examples, controller device 702 may include a third user input mechanism configured to control other room features, such as a light fixture (not shown in FIG. 7).

Figure 8:
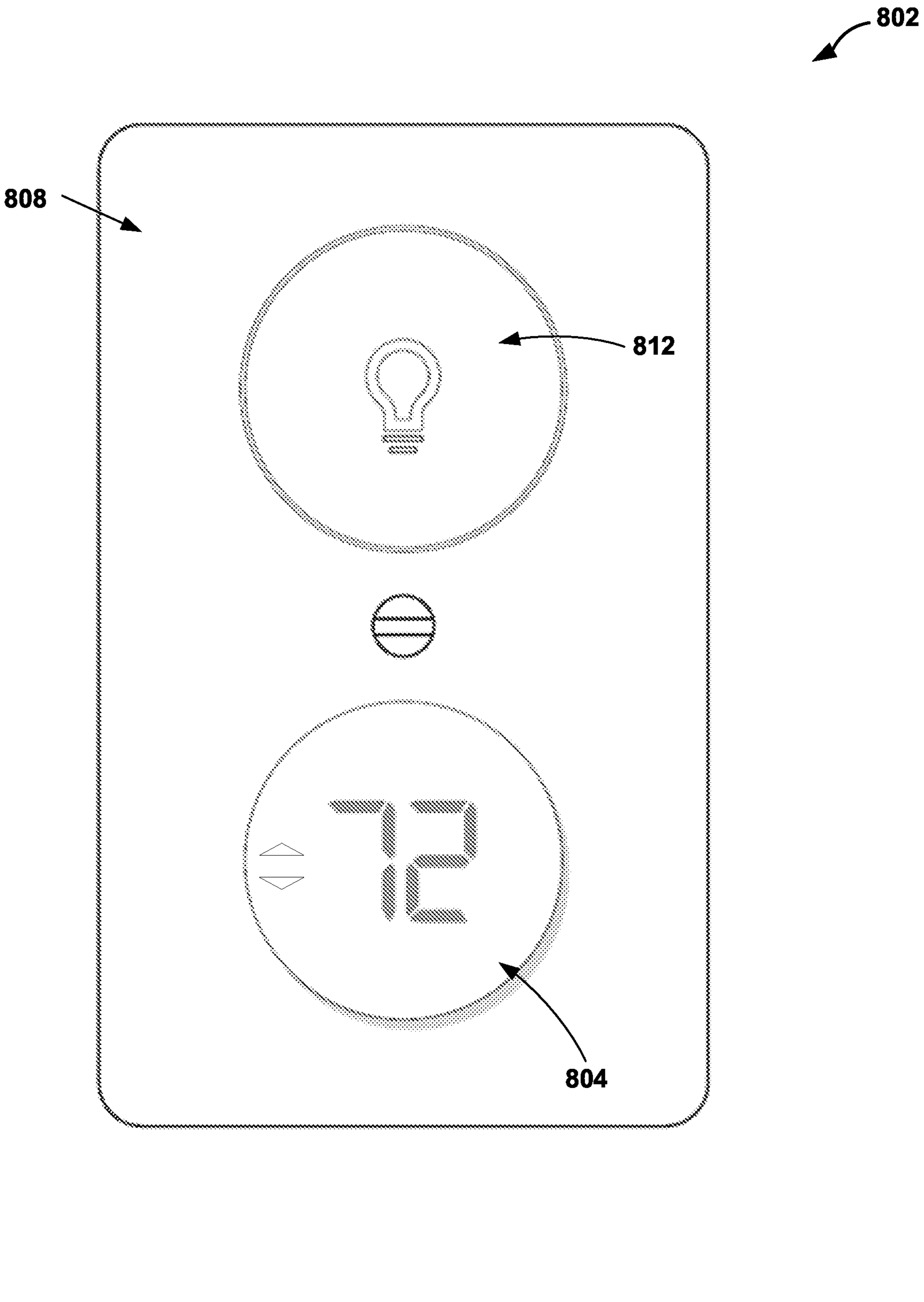
FIG. 8 is a conceptual diagram illustrating an example of a controller device with both light control and temperature control according to one or more techniques of this disclosure.

FIG. 8 is a conceptual diagram illustrating an example of a controller device with both light control and temperature display according to one or more techniques of this disclosure. Controller device 802 is an example of controller devices 102, 202, 320 and 702 described above in relation to FIGS. 1-3 and 7 and may include the same or similar functions and characteristics. For example, in some examples controller device 802 may be powered by a battery or similar energy storage device, which may simplify installation.

Controller device 802 includes housing 808 and user input mechanisms 804 and 812. User input mechanisms 804 and 812 are examples of UI 206 described above in relation to FIG. 2. User input mechanism 804 includes a display and may also include one or more features for a user to cause transmitter circuitry within housing 808 to send signals to a register device, or valve device. In the example of FIG. 8, user input mechanism 804 includes a display, which may be configured to display room temperature or other measurements from one or more sensors. The display may also be configured to show temperature setpoint or otherwise communicate with processing circuitry within housing 808 (not shown in FIG. 8). In some examples, user input mechanism 804 may just be configured as a display, with no user input functionality. In some examples, user input mechanism 804 may include arrow buttons or other input features. For example, tapping on the display may cause the processing circuitry to display a variety of control or display options.

User input mechanism 812 may connect to a switch, such as switch 214 described above in relation to FIG. 2. In the example of FIG. 8, user input mechanism 812 may be a momentary, toggle or capacitively coupled switch control mechanism. Operating user input mechanism 812 may control the operation of a light fixture, for example.

In one or more examples, the functions described above may be implemented in hardware, software, firmware, or any combination thereof. For example, the various components of FIG. 2 may be implemented in hardware, software, firmware, or any combination thereof. If implemented in software, the functions may be stored on a tangible computer-readable storage medium and executed by a processor or hardware-based processing unit.

Instructions may be executed by one or more processors, such as one or more DSPs, general purpose microprocessors, ASICs, FPGAs, or other equivalent integrated or discrete logic circuitry. Accordingly, the term "processor," as used herein, such as may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described Various examples of the disclosure have been described. These and other examples are within the scope of the following claims.

The invention claimed is:

1. A system comprising:
- a register device comprising:
  - one or more dampers;
  - a motor configured to adjust a positioning of the one or more dampers to at least a first damper position and a second damper position,
    - wherein in the first damper position, the one or more dampers are open, and
    - wherein in the second damper position, the one or more dampers are closed;
  - receiver circuitry; and
  - a first power source configured to deliver power to the motor and the receiver circuitry;
- a controller device configured to receive user input, the controller device comprising:
  - transmitter circuitry configured to:
    - wirelessly transmit, in response to a first user input, a first signal to the receiver circuitry of the register device to cause the motor to adjust the positioning of the one or more dampers to the first damper position; and
    - wirelessly transmit, in response to a second user input, a second signal to the receiver circuitry of the register device to cause the motor to adjust the positioning of the one or more dampers to the second damper position;
  - wherein the controller device is further configured to, in response to a fourth user input, operate a light switch or an outlet within a room; and
- a second power source configured to deliver power to the transmitter circuitry.

2. The system of claim 1, wherein the transmitter circuitry is further configured to wirelessly transmit, in response to a third user input, a third signal to the receiver circuitry to cause the motor to adjust positioning of the one or more dampers to a third damper position,
- wherein the third damper position is between the first damper position and the second damper position.

3. The system of claim 1, wherein the controller device further comprises a second user input mechanism, and
- wherein the transmitter circuitry is further configured to wirelessly transmit, in response to a third user input at the second user input mechanism, a third signal to the receiver circuitry to cause the motor to adjust positioning of the one or more dampers to a third damper position, wherein the third damper position is between the first damper position and the second damper position.

4. The system of claim 1, wherein the controller device further comprises a second user input mechanism, processing circuitry, and a sensor, wherein in response to user input at the second user input mechanism the processing circuitry sets a temperature setpoint, and wherein the transmitter circuitry is further configured to wirelessly transmit a third signal to the receiver circuitry to cause the motor to adjust positioning of the one or more dampers based on a magnitude of temperature measured at the sensor relative to the temperature setpoint.

5. The system of claim 1, wherein the second signal is configured to cause the register device to block air flow to the room.

6. The system of claim 1, wherein the first signal and the second signal are configured to have higher priority than a third signal from a second controller device, and wherein the register device adjusts the positioning of the one or more dampers to comply with the first signal or the second signal without regard for the third signal.

7. A controller device comprising:

transmitter circuitry configured to:

wirelessly transmit, in response to a first user input, a first signal to a register device, separate from the controller device, to cause the register device to adjust the positioning of one or more dampers of the register device to a first damper position; and wirelessly transmit, in response to a second user input, a second signal to the register device to cause the register device to adjust the positioning of the one or more dampers to a second damper position; and a power source configured to deliver power to the transmitter circuitry;

wherein the controller device is further configured to, in response to a fourth user input, operate a light switch or an outlet within a room.

8. The controller device of claim 7, wherein in the first damper position, the one or more dampers are open and in the second damper position, the one or more dampers are closed.

9. The controller device of claim 8, wherein the transmitter circuitry is further configured to wirelessly transmit, in response to a third user input, a third signal to the register device to cause the register device to adjust positioning of the one or more dampers to a third damper position, wherein the third damper position is between the first damper position and the second damper position.

10. The controller device of claim 8, wherein the controller device further comprises processing circuitry and a sensor, wherein in response to user input the processing circuitry sets a temperature setpoint, and wherein the transmitter circuitry is further configured to wirelessly transmit a third signal to the register device to cause the register device to adjust positioning of the one or more dampers based on a magnitude of temperature measured at the sensor relative to the temperature setpoint.

11. The controller device of claim 7, wherein the first signal and the second signal are configured to have higher priority than a third signal from a second controller device, and wherein the register device adjusts the positioning of the one or more dampers to comply with the first signal or the second signal without regard for the third signal.

12. A system comprising:

a controller device, comprising transmitter circuitry configured to:

wirelessly transmit, in response to a first user input, a first signal to a register device, separate from the controller device, to cause the register device to adjust the positioning of one or more dampers of the register device to a first damper position; and wirelessly transmit, in response to a second user input, a second signal to the register device to cause the register device to adjust the positioning of the one or more dampers to a second damper position; and a power source configured to deliver power to the transmitter circuitry;

wherein the controller device is further configured to, in response to a fourth user input, operate a light switch or an outlet within a room.

13. The system of claim 12, further comprising the register device.

14. The system of claim 12, further comprising a valve.

15. The system of claim 14, wherein the transmitter circuitry is configured to wirelessly transmit, in response to the first user input, a third signal to the valve, separate from the controller device, to cause the valve to adjust the positioning of the valve to a first valve position; and wherein the transmitter circuitry is configured to wirelessly transmit, in response to the second user input, a fourth signal to the valve, separate from the controller device, to cause the valve to adjust the positioning of the valve to a second valve position.

16. The system of claim 15, wherein the third signal and the fourth signal are transmitted concurrently with the first signal and the second signal.

* * * * *